United States Patent [19]

Kiikka et al.

[11] Patent Number: 4,650,559
[45] Date of Patent: Mar. 17, 1987

[54] CARBON ELECTRODE FOR REDUCING DUSTING AND GASIFICATION IN AN ELECTROLYTIC CELL

[76] Inventors: Oliver A. Kiikka, 36222 Skytop La., Willoughby, Ohio 44094; Harry A. Adams, 6300 S. Perkins, Bedford Hts., Ohio 44146

[21] Appl. No.: 671,234

[22] Filed: Nov. 14, 1984

[51] Int. Cl.⁴ .......................... C25C 3/12; C25C 7/02; H01B 1/04
[52] U.S. Cl. ........................ 204/294; 204/67; 252/502; 252/510; 264/105
[58] Field of Search .............. 204/67, 294; 264/105; 252/502, 510

[56] References Cited

U.S. PATENT DOCUMENTS

| | | | |
|---|---|---|---|
| 1,017,483 | 2/1912 | Van Brunt | 252/510 |
| 1,899,064 | 2/1933 | Storey et al. | 264/105 |
| 3,284,334 | 11/1966 | Metrailer et al. | 204/67 |
| 3,598,528 | 6/1969 | Franz et al. | |
| 3,787,300 | 1/1974 | Johnson | 204/67 |
| 3,954,674 | 5/1976 | Reis | 252/502 |
| 4,011,303 | 3/1977 | MacGregor | |
| 4,341,751 | 7/1982 | Kiikka et al. | |
| 4,406,872 | 9/1983 | Kapner et al. | |

FOREIGN PATENT DOCUMENTS 0484014  4/1938  United Kingdom ............... 204/67

OTHER PUBLICATIONS

"Increasing the Oxidation Resistance of Carbonaceous Bodies", Limonchik, Light Metals, pp. 459–470 (1981).
"New Developments in Upgrading Coal Tar Electrode Pitches", Kremer & Cukier, Light Metals, pp. 673–682 (1983).
Kirk, Othmer, vol. 1, pp. 931–954.

*Primary Examiner*—Howard S. Williams
*Attorney, Agent, or Firm*—Wayne D. Porter, Jr.

[57] ABSTRACT

Carbon dioxide reactions occurring during carbon electrode use in the production of aluminum can be decreased by contacting the outer surface of the calcined coke with elemental sulfur prior to the formation of the coke into an electrode.

19 Claims, 2 Drawing Figures

EXAMPLE 7

TEMP °C
940°
950°
950°

WITH SULFUR ADDITIVE
EXAMPLE 7

WITHOUT SULFUR ADDITIVE
EXAMPLE 2

| TEMP °C | TIME HRS. | TEST SEVERITY CONDITIONS |
|---|---|---|
| 940° | 4 | 1 |
| 950° | 4 | 2 |
| 950° | 6 | 3 |

CARBON ELECTRODE FOR REDUCING DUSTING AND GASIFICATION IN AN ELECTROLYTIC CELL

BACKGROUND OF THE INVENTION

1. Field of the Invention

The present invention generally concerns the manufacture and use of carbon electrodes and, more particularly, pertains to carbon anodes used for the production of aluminum in which the detrimental characteristics of dusting and gasification are reduced.

2. Description of the Prior Art

As is well known in the art, petroleum coke is used for the manufacture of carbon electrodes which are utilized in the aluminum industry. The description of such utilization for making aluminum can be found in Kirk-Othmer, *Encyclopedia of Chemical Technology*, Vol. 1, p. 941.

Prior to the formation of electrodes, the refinery petroleum coke must first be calcined. Calcination usually occurs with temperatures in excess of 2200° F., and preferably above 2500° F. The calcination densifies the coke and removes volatile matter therefrom, while changing the carbon to hydrogen ratio.

The coke exiting the calciner at these high temperatures must then be cooled. This is typically accomplished in a cooler wherein water is sprayed onto the coke. The water, by evaporation, cools the coke to a suitable temperature. This calcined, cooled coke is then formed into electrodes.

Carbon electrodes, or anodes, are typically formed from mixing regular grade coke, binder pitch, and sometimes butts (recycled anode remnants). The mixture is extruded under high pressure to form a green anode. The anode is subsequently baked in a furnace and placed in the electrolytic cell or pot-line in which aluminum is produced.

The normal aluminum pot reaction in an electrolytic cell is governed by the formula:

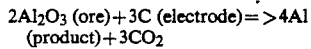

$$2Al_2O_3 \text{ (ore)} + 3C \text{ (electrode)} => 4Al \text{ (product)} + 3CO_2$$

This reaction provides for a theoretical amount of consumed carbon to be 0.334 lbs. of carbon per lb. of produced aluminum.

A number of problems, associated with this reaction, are also well known in the aluminum industry. Actual carbon consumption in the above-described reaction is typically 0.45–0.50 lbs. of carbon per lb. of produced aluminum. It is believed that a major cause for this increased consumption, and consequent decrease in efficient operating life, is due to gasification and erosion of carbon dust particles at the anode in the electrolytic cell. The carbon dusting and gasification occur when carbon dioxide, evolved from the reduction process, passes over the anode and reacts with the carbon to form carbon monoxide, according to the formula:

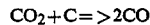

$$CO_2 + C => 2CO$$

The carbon monoxide can subsequently decompose to form carbon dust and $CO_2$. This formation of carbon dust, by definition, decreases the amount of carbon available to produce aluminum. The particles of carbon also float to the surface of the bath, causing additional problems within the cell. These carbon particles can provide a short circuit between the anode and cathode of the cell as well as form a heat insulating layer on the surface of the bath which can result in the overheating thereof.

As a consequence of the foregoing problems, tests have been developed to measure a carbon electrode's dusting and gasification characteristics within an electrolytic cell. Gasification is defined as the amount of gas released during the dusting of an electrode, i.e., residue wt.% + dusting wt.% + gasification wt.% equals one electrode. A related property of ground coke, which is well known in the art, is the coke's carboxy reactivity, which is defined as the ability of ground coke to react with $CO_2$ to form carbon monoxide.

The chemical mechanism believed to be involved in promoting dusting and gasification of an electrode is the action of cations, especially Na, Mg, Ca and Fe, present as ash components which reside in or on the surface of the electrode, which catalyze the reaction of $CO_2$ with the carbon in the electrode. These cations are also known to effect the carboxy reactivity of coke before it is formed into an electrode. As is shown in U.S. Pat. No. 4,341,751, it is known that the carboxy reactivity of calcined coke is reduced by providing the quench water with, preferably, orthophosphoric acid which acts to remove these cations from the surface of the coke. It has subsequently been found that, although this treatment of the quench water does indeed inhibit the carboxy reactivity of calcined coke, it does not significantly alter the dusting and gasification characteristics of the formed carbon electrode and, consequently, does not alleviate any of the aforementioned problems associated with dusting and gasification and the lowered production efficiency of the anode resulting therefrom.

Additionally, another problem exists in large electrode producing ovens. Typically, a number of anodes are stacked in an oven, and baked at an elevated temperature of approximately 2200° F. for about 30 days to produce aluminum as is well known in the art. During the baking process, a temperature gradient develops across the bank of anodes within the oven. The outermost anodes vary in temperature by as much as ±200° F. from the internally positioned anodes. It has been found that these outer anodes have increased dusting and gasification and, therefore, decompose at a much greater rate than the centrally located anodes. Accordingly, because this temperature gradient exists, there is a strong need to develop anodes having improved dusting and gasification characteristics which exist independently of temperature variations within the oven.

SUMMARY OF THE INVENTION

The present invention is a process, and an article produced therefrom, for reducing the dusting and gasification of coke in electrode form during the production of aluminum by the steps of: (a) calcining the coke to densify and reduce volatile materials contained therein; (b) cooling the calcined coke by contacting the coke with a fluid; and (c) treating the outer surface of the coke with sulfur. In step (a), the coke is calcined at elevated temperatures. In step (b), the fluid includes water which may or may not be treated to aid in the removal of cations on the surface of the coke. In step (c), the sulfur treatment can be applied in any form which provides adequate surface contact between sulfur and coke, i.e., aqueous dispersion, molten, in an organic compound, or in powder water suspension form. It should be understood that the present invention applies to any source of coke, but preferably utilizes petroleum derived coke.

Prior to anode formation, regular grade coke must first be calcined. The calcining of coke is known to those in the art and is typically accomplished in a rotary calciner. Calcination occurs at temperatures in excess of 2200° F., and preferably above 2500° F. The calcination densifies the coke and removes volatile material therefrom while changing the carbon to hydrogen ratio. The coke exits the calciner at high temperatures of approximately 2800° F., and must subsequently be cooled. The cooling is accomplished by a cooling means, typically a rotary cooler, which utilizes a quenching fluid, preferably comprised substantially of water, which is directly sprayed onto the coke. The fluid, through evaporation, cools the coke to a suitable temperature.

As the coke is cooled to a temperature of approximately 300° F., de-dusting oil is added to a mixing means which simultaneously begins to mix the coke. The sulfur is added to the de-dusting oil, and the combination of sulfur and de-dusting oil is fed into the mixer. The de-dusting oil and sulfur combination is added at about 0.5 wt.% of the coke within the mixer. The sulfur then contacts the surface of the coke enabling a reaction to occur between the ash components and the free radical sulfur molecules, thereby poisoning and inhibiting the catalyst mechanism as described in the above-mentioned carbon dioxide reaction. The coke is then ready to be formed into electrodes.

DETAILED DESCRIPTION OF THE INVENTION

Figure 2:
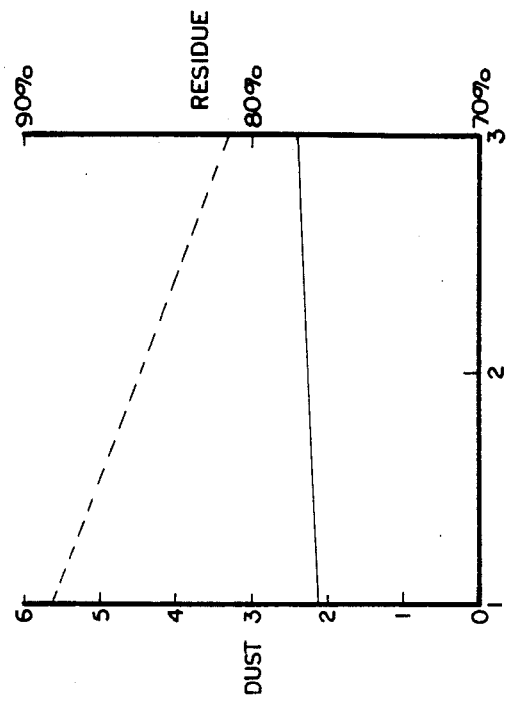
FIG. 2 depicts the dusting and gasification characteristics of an electrode with a sulfur additive according to the teachings of the present invention.

For purposes of illustration, and to facilitate a complete understanding of the present invention, the operation of the process of the present invention will be described in a typical industry environment.

Regular grade coke is first calcined in a rotary calciner at a temperature above 2500° F., and preferably at 2800° F. The rotary calciner produces calcined coke at a rate of 40 tons per hour. The calcined coke travels through a spill chamber and into a rotary cooler in which quench water is sprayed onto the calcined coke to lower the temperature thereof to approximately 300° F. The quench water is applied at a rate of 2 lbs. of water per lb. of coke. The quench water may or may not be treated to reduce carboxy reactivity. A sulfur additive in a liquid state, typically in a water dispersion, molten, organic or treated powder form, can be added to the quench water for cooling the coke. Although possible, this is not preferable because of problems arising form wetting the coke and the more important, and hazardous, environmental consequences of vaporized sulfur being released from the rotary cooler into the atmosphere. Such a release would necessitate the placement of appropriate scrubbers, and the like, thereby increasing the cost of each ton produced. The more preferred way of adding the sulfur is to pass the cooled calcined coke from the cooler to a mixing means which also has de-dusting oil supplied thereto. The mixing means can be a Z-type mixer, or any type which adequately mixes the coke in the presence of the de-dusting oil. The de-dusting oil has sulfur added to it, either in molten, aqueous dispersion, organic or powdered suspension form, and the combination is sprayed onto the coke and is applied thereon. The de-dusting oil sulfur combination is added in an amount 0.5 wt.% of the coke. The sulfur can be added to the de-dusting oil in an amount within the range of 5 wt.% to 30 wt.%, with the preferred amount being within the range of 10 wt.% to 15 wt.%. The sulfur additive contacts the ash particles on the surface of the coke and by reacting with the cations inhibits the ability of the carbon, when formed into an electrode, to react with carbon dioxide in the electrolytic cell. It is believed that, by treating the coke, the sulfur is applied directly to the reactive surface of the coke thereby providing a more effective reaction between ash components and the elemental sulfur.

EXAMPLES

1. Description of the Tests and Analysis

All tests were conducted using regular grade calcined coke and pitch which were mixed and extruded into cylindrical bars having a diameter of approximately 4 in. in length and ⅝ in. in diameter. The rod is pre-baked and is placed into a coke bed for 4 days and maintained at a temperature of 2200° F. The cylindrical electrode is then removed from the coke bed and is weighed and placed under the conditions as specified in the examples as outlined below. After undergoing experimental test conditions of regulated, but varied, temperature and time, the anode is removed and both the brushed off dust and the residue of the electrode are weighed. The difference between these two values, and the original weight of the anode, provides the loss, or gasification, in terms of wt.%. As will be readily seen from the results set out below, a number of tests were conducted in an attempt to measure the effect of added sulfur to the dusting and gasification characteristics (Tables 1 and 2) and carboxy reactivity characteristics (Table 3) of an electrode in an electrolytic cell.

2. Description of the Preferred Embodiment

The preferred embodiment of the novel aspects of the invention will now be described in the following non-limited examples and discussion.

It is considered helpful first to summarize the test-based analytical results. Table 1 shows the results for a number of test electrodes which were subjected to increasingly severe, in terms of time and temperature, test conditions:

TABLE 1

| | | | Gasification Test Results on Coke Prepared Electrodes | | | | | |
|---|---|---|---|---|---|---|---|---|
| Example Number | Weight gms | Time- Hrs. | Avg. Temp. °C. | Test Results, wt % | | | Additives, ppm | |
| | | | | Residue | Dust | Loss | P | S |
| 1 | 29 | 4 | 939.3 | 89.0 | 2.1 | 8.9 | 40 | 400 |
| 2 | 29 | 4 | 940.3 | 87.7 | 2.4 | 9.9 | 0 | 0 |

TABLE 1-continued

Gasification Test Results on Coke Prepared Electrodes

| Example Number | Weight gms | Time-Hrs. | Avg. Temp. °C. | Test Results, wt % Residue | Dust | Loss | Additives, ppm P | S |
|---|---|---|---|---|---|---|---|---|
| 3 | 29 | 4 | 950.5 | 82.3 | 3.8 | 13.9 | 0 | 0 |
| 4 | 29 | 6 | 950.6 | 72.2 | 5.0 | 22.7 | 0 | 0 |
| 5 | 29 | 6 | 950.6 | 82.2 | 2.1 | 15.7 | 0 | 400 |
| 6 | 29 | 6 | 950.3 | 81.0 | 1.8 | 17.1 | 40 | 400 |
| 7 | 29 | 6 | 950.2 | 81.1 | 2.4 | 16.5 | 40 | 400 |
| 8* | 29 | 6 | 950.2 | 74.0 | 5.1 | 20.9 | 40 | 750 |
| 9** | 29 | 6 | 950.6 | 79.6 | 2.3 | 18.1 | 40 | 750 |
| 10 | 29 | 6 | 950.5 | 84.8 | 1.3 | 13.9 | 40 | 750 |
| 11 | 26 | 6 | 950.1 | 82.8 | 1.7 | 15.5 | 40 | 2000 |

*Abnormal appearance of product after test.
**Repeat run on Example 8.
Code:
P = Phosphoric acid added to quench water
S = Sulfur dispersion added to dedusting oil
All tests run in soft water.

Table 1 discloses the results of a number of test electrodes and provides, in tabular form, the effect of a sulfur additive on the dusting and gasification characteristics of an anode.

The first two anodes, Example 1 and Example 2, were held at constant time and temperature, the residue being increased only slightly by adding phosphorous and sulfur. By comparing these results to the other test results of Table 1, it is apparent that the time and temperature used were insufficiently severe to show the full effect of the sulfur additive. For example, by comparing Example 4, which has no sulfur additive, to Example 5, both of which are subjected to conditions of greater severity, i.e. higher temperature for a longer period of time, the effect of the sulfur additive is readily apparent. The sulfur additive increased the amount of residue from 72.2 wt.% to 82.2 wt.%.

Figure 1:
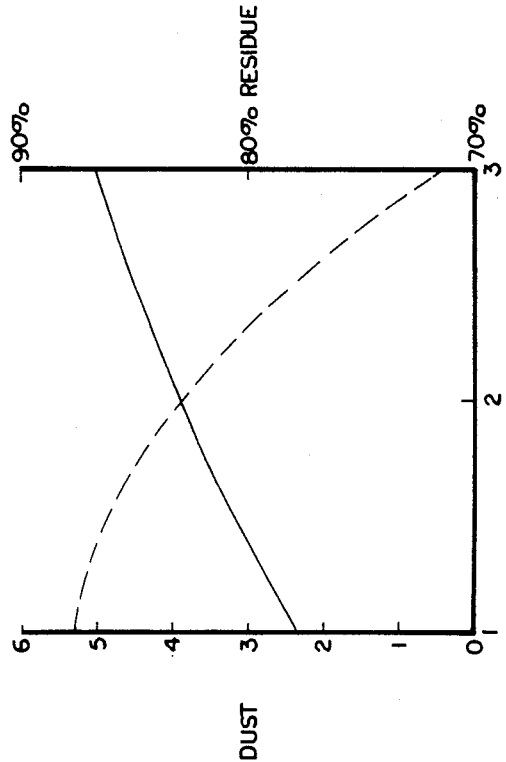
FIG. 1 graphically shows the dusting and gasification characteristics of an electrode without a sulfur additive.

FIGS. 1 and 2 graphically show the effect of the sulfur additive on Example 2 and Example 7 at increasingly severe test conditions. As the severity of the conditions increases, i.e. the time and temperature are increased, the amount of residue dramatically decreases for Example 2 which does not use a sulfur additive, while the residue amount remains relatively constant for Example 1 containing the sulfur additive. The values to generate FIG. 1 were taken from Table 1.

By summarizing the results of Table 1, Table 2 was generated and presents the overall effects of the sulfur additive on residue, dusting and gasification in percentage form:

TABLE 2

Summary of Table 1
Gasification Test Results on Coke Prepared Electrodes

| Example No. | Sulfur Additive ppm, in Coke | Residue wt % | Dusting wt % | Gasification wt % |
|---|---|---|---|---|
| 7 | 400 | 81.1 | 2.4 | 16.5 |
| 6 | 400 | 81.0 | 1.8 | 17.1 |
| 5 | 400 | 82.2 | 2.1 | 15.7 |
| 9 | 750 | 84.8 | 1.3 | 13.9 |
| 11 | 2000 | 82.8 | 1.7 | 15.5 |
| Averaged Results from Tests with Sulfur Additive | | 82.4 | 1.8 | 15.8 |
| Averaged Results from Tests without Sulfur Additive | | 72.2 | 5.0 | 22.7 |
| Actual Percent Change | | +10.2 | −3.2 | −6.9 |
| Percent Improvement | | 14 | 64 | 30 |

Notes:
(1) Anodes composed of coke and coal tar pitch.
(2) Test conditons:
Temperature 950° C.
Time - 6 hours
Purge Rate (CO₂) 2 liter/gm of sample/hr As can be seen from Table 2, the addition of sulfur in an aqueous dispersion added to the de-dusting oil provides an increase in residue with a corresponding decrease in dusting and gasification. Accordingly, an improved anode having a greater than 10% increase in residue, by definition, increases the pot efficiency because it can provide an increased amount of carbon for aluminum production instead of the undesirable carbon monoxide reaction. Further, FIGS. 1 and 2 imply that the improved resistance to dusting shall exist irrespective of more severe conditions, i.e. differences in temperature. Therefore, the sulfur additive is temperature insensitive thereby solving the temperature gradient problem recited above.

Table 3 presents, in tabular form, results of testing samples of coke in a carbon dioxide atmosphere to ascertain whether the sulfur additive had any effect on the carboxy reactivity of coke. Ten grams of coke having 10×14 mesh particle size were treated with a sulfur emulsion which was added to the quench water spray or to the de-dusting oil and applied to the coke in a mixing means. The coke was maintained at 1000° C. for 2 hours while dry $CO_2$ gas flowed over it. The coke was then weighed to determine any weight loss due to a loss of carbon.

TABLE 3

Coke CO₂ Reactivity Test Results Using Sulfur and Phosphoric Acid Additives

| Example No. | Water Hard | Type Soft | Phos. Acid ppm | Sulfur Emulsion ppm | CO₂ Reactivity % |
|---|---|---|---|---|---|
| 1 | X | | 0 | 0 | 18.4 |
| 2 | | X | 0 | 0 | 12.7 |
| 3 | | X | 40 | 0 | 11.4 |
| 4 | | X | 40 | — | — |

TABLE 3-continued

Coke $CO_2$ Reactivity Test Results Using Sulfur and Phosphoric Acid Additives

| Example No. | Water Hard | Type Soft | Phos. Acid ppm | Sulfur Emulsion ppm | $CO_2$ Reactivity % |
|---|---|---|---|---|---|
| 5 | | X | 40 | 750 | 11.8 |
| 6 | | X | 40 | 400 | 11.0 |
| 7 | | X | 40 | 2000 | 10.2 |
| 8 | | X | 20 | 750 | 9.9 |
| 9 | | X | 20 | 400 | 9.9 |
| 10 | | X | 20 | 2000 | 9.7 |
| 11 | | X | 0 | 750 | 11.7 |

Note:
Added Phosphoric Acid to the quench water spray for each test; added Sulfur to the de-dusting oil, except Example 2 where Sulphur was added to the quench water spray.

As can be seen from the results of Table 3, the amount of sulfur added, 400-2000 ppm, had no overall impact on the carboxy reactivity. The accuracy of measurement was ±2%. The only significant differences seen in reactivity are due to the use of soft water, which has reduced cations, and the use of phosphoric acid, which is a known carboxy reactivity reducer.

While the invention has been described in detail and with reference to specific embodiments thereof, it will be apparent to one skilled in the art that various changes and modifications can be made therein without departing from the scope and spirt thereof, and therefore the invention is not intended to be limited by such description and examples.

What is claimed is:

1. A process for reducing the dusting and gasification of coke in electrode form during the production of aluminum by the steps of:
   (a) calcining the coke to densify and reduce volatile materials contained therein;
   (b) cooling the calcined coke by contacting the coke with a fluid; and
   (c) treating a surface of the coke with sulfur.

2. The process of claim 1, wherein treating the coke with sulfur includes applying sulfur in an aqueous dispersion to the coke and mixing the sulfur and coke to promote surface contact therebetween.

3. The process of claim 1, wherein applying sulfur includes providing the sulfur in a substantially molten form to the coke.

4. The process of claim 1, wherein treating the coke with sulfur includes adding sulfur to de-dusting oil to form a combination, spraying the combination onto the coke, and mixing the combination and coke to promote surface contact therebetween.

5. The process of claim 4, wherein the sulfur is added to the de-dusting oil in powder form in a water suspension.

6. The process of claim 4, wherein the sulfur is added to the de-dusting oil in an aqueous dispersion which primarily includes water and sulfur.

7. The process of claim 4, wherein the sulfur is added to the de-dusting oil in an organic compound.

8. The process of claim 4, wherein the sulfur is elemental sulfur.

9. The process of claim 4, wherein the sulfur is added in an amount between 400-2000 ppm.

10. The process of claim 4, wherein the de-dusting oil and sulfur combination is added to the coke in an amount of 0.5 wt.% of the coke.

11. The process of claim 1, wherein the treating of the coke with sulfur occurs at a temperature of approximately 300° F.

12. The process of claim 1, wherein the calcining of the coke is at a temperature greater than 2500° F.

13. The process of claim 1, wherein the fluid is substantially water.

14. An improved process for reducing the dusting and gasification of coke in electrode form during the production of aluminum wherein the coke is calcined and subsequently cooled by water quenching, the improvement comprising the steps of:
   contacting the outer surface of the calcined coke with elemental sulfur in an aqueous dispersion; and
   simultaneously mixing the calcined coke and aqueous dispersion to promote surface contact therebetween.

15. The improved process of claim 14, wherein the contacting includes adding the aqueous dispersion to de-dusting oil and spraying the aqueous dispersion and de-dusting oil onto the surface of the calcined coke.

16. The improved process of claim 14, wherein the contacting of coke with sulfur occurs at a temperature of approximately 300° F.

17. The process of claim 4, wherein the sulfur is added to the de-dusting oil in an amount within the range of 5 wt.% to 30 wt.%.

18. A carbon electrode for use in an electrolytic cell, the electrode comprising:
   calcined coke having ash components on a surface thereof; and
   elemental sulfur in contacting relation to the ash components.

19. A carbon electrode for use in an electrolytic cell, the electrode produced by the process of:
   calcining the coke to densify and reduce volatile materials contained therein;
   cooling the calcined coke by contacting the coke with a fluid;
   treating a surface of the coke with elemental sulfur;
   mixing the sulfur treated coke with pitch;
   extruding the mixture of coke and pitch into an anode shape; and
   baking the anode shape.

* * * * *